Patented Mar. 19, 1940

2,194,337

UNITED STATES PATENT OFFICE 2,194,337

GREASEPROOF ZEIN COMPOUND

Collins Veatch, La Grange, Ill., assignor, by mesne assignments, to Corn Products Refining Company, New York, N. Y., a corporation of New Jersey No Drawing. Application August 2, 1937, Serial No. 156,997

5 Claims. (Cl. 134—12)

This invention relates to the production of plastic compounds, intended more especially for protective films or coatings, containing zein and urea; and to the treatment with such compounds of paper, card-board, fiber-board, cloth, or other sheets or bodies of fibrous or fiber-containing materials (which will be referred to herein under the general term of "fibrous bodies") for the purpose of making such bodies greaseproof or grease resistant; and a primary object of the invention is to improve the character of the film by incorporating with the zein and urea an oil immiscible glycol such as specified in the examples given below, which acts to some extent as a plasticizer, especially as a stabilizer for counteracting the tendency of urea, as the applicant has discovered, to denature, that is to say, to insolubilize the zein in its solution in aqueous alcohol or other similar solvents. The invention does not contemplate the use of formaldehyde or other hardening agent of the methylene type. The urea and glycol are present in the compound with the zein as such in a homogeneous colloidally dispersed state and not as components of a more complex chemical compound.

Obviously, the composition of matter, of this invention, may be used for other purposes than the treatment of fibrous sheets or bodies.

Aqueous ethyl alcohol is the preferred zein solvent but other known solvents of zein and the other ingredients might be used.

The urea may be used in varying proportions; and, generally, the glycol should be used in quantities as great as, or greater than, the urea. The ingredients of the compound may be mixed together without heating. The solution may be applied to the body to be coated, or otherwise treated, by dipping or by a brush, or by rolls and the treated article may be air dried or heated to bring about evaporation of the zein solvent.

The following are preferred formulas in which the proportions are given by weight. These examples are to be taken as typical and informative and not as limiting the invention to the particulars specified.

Example 1

| | Parts |
|---|---|
| Dry zein | 100 |
| 92% ethyl alcohol | 300 |
| Urea | 20 |
| Propylene glycol | 30 |

Example 2

| | |
|---|---|
| Dry zein | 100 |
| 92% ethyl alcohol | 300 |
| Urea | 20 |
| Ethylene glycol | 30 |

Example 3

| | |
|---|---|
| Dry zein | 100 |
| 92% ethyl alcohol | 300 |
| Urea | 20 |
| Tri-ethylene glycol | 20 |

Example 4

| | |
|---|---|
| Dry zein | 100 |
| 92% ethyl alcohol | 300 |
| Urea | 12 |
| Di-ethylene glycol | 12 |

In all of the examples given above the urea may be varied to a considerable extent, for example, from 10 to 25 parts, in which case the glycol should be used in proportionately increased quantities, that is, with the glycol in amounts at least equal to and preferably somewhat greater than the amounts of urea.

The intention is to cover all equivalents and modifications of the above disclosures within the scope of the appended claims.

I claim:

1. Coating compound which is greaseproof consisting of the evaporated and solidified product of zein 100 parts; 92% ethyl alcohol 300 parts; urea 10–25 parts; and glycol in amount at least equal to the urea.

2. Coating compound which is greaseproof consisting of the evaporated and solidified product of zein 100 parts; 92% ethyl alcohol 300 parts; urea 20 parts and glycol 20–30 parts.

3. Compound consisting of the evaporated and solidified product of the following substances in proportions by weight as follows: zein 100 parts; urea 20 parts and propylene glycol 30 parts.

4. Compound consisting of the evaporated and solidified product of the following substances in proportions by weight as follows: zein 100 parts; 92% ethyl alcohol 300 parts; urea 20 parts; and ethylene glycol 30 parts.

5. Compound consisting of the evaporated and solidified product of the following substances in proportions by weight as follows: zein 100 parts; 92% ethyl alcohol 300 parts; urea 12 parts; di-ethylene glycol 12 parts.

COLLINS VEATCH.